(12) United States Patent
Samman et al.

(10) Patent No.: US 12,541,792 B1
(45) Date of Patent: *Feb. 3, 2026

(54) EXCHANGE RISK CONTROLS

(71) Applicant: Cboe Exchange, Inc., Chicago, IL (US)

(72) Inventors: Luca Samman, Jersey City, NJ (US); Kevin Carrai, New York, NY (US); Adam Inzirillo, Bay Shore, NY (US)

(73) Assignee: Cboe Exchange, Inc., Chicago, IL (US)

( * ) Notice: Subject to any disclaimer, the term of this patent is extended or adjusted under 35 U.S.C. 154(b) by 37 days.

This patent is subject to a terminal disclaimer.

(21) Appl. No.: 18/444,600

(22) Filed: Feb. 16, 2024

Related U.S. Application Data

(63) Continuation of application No. 17/386,900, filed on Jul. 28, 2021, now Pat. No. 11,908,008, which is a continuation of application No. 16/881,711, filed on May 22, 2020, now Pat. No. 11,710,181.

(60) Provisional application No. 63/021,518, filed on May 7, 2020, provisional application No. 62/967,303, filed on Jan. 29, 2020, provisional application No. 62/959,731, filed on Jan. 10, 2020.

(51) Int. Cl.
*G06Q 40/04* (2012.01)
*G06Q 40/06* (2012.01)

(52) U.S. Cl.
CPC .......... *G06Q 40/04* (2013.01); *G06Q 40/06* (2013.01)

(58) Field of Classification Search
CPC ..................................................... G06Q 40/00
USPC ......................................................... 705/35
See application file for complete search history.

(56) References Cited

U.S. PATENT DOCUMENTS

| | | | |
|---|---|---|---|
| 5,168,446 A | 12/1992 | Wiseman | |
| 5,297,032 A * | 3/1994 | Trojan | G06Q 40/04 705/37 |
| 5,761,442 A * | 6/1998 | Barr | G06Q 40/06 705/36 R |

(Continued)

FOREIGN PATENT DOCUMENTS

| | | |
|---|---|---|
| CA | 2784262 | 6/2011 |
| CA | 2799155 | 11/2011 |

(Continued)

OTHER PUBLICATIONS

Final Written Decision of Patent Trial and Appeal Board in CBM2018-00020, mailed Oct. 10, 2019.

(Continued)

*Primary Examiner* — Kirsten S Apple
(74) *Attorney, Agent, or Firm* — Fish & Richardson P.C.

(57) ABSTRACT

An exchange computer system for improving risk management is described. A user may create a risk profile that includes a risk threshold, and may identify a set of one or more security transaction orders to be associated with the risk profile. The exchange computer system may receive the risk profile from a user device, determine that the set of one or more security transaction orders are associated with the risk profile, and monitor the one or more security transaction orders included in the set. Based on the monitoring, the exchange computer system may determine that the risk threshold is satisfied. In response to determining that the risk threshold is satisfied, the exchange computer system may alert the user and cancel the one or more security transaction orders included in the set.

20 Claims, 3 Drawing Sheets

(56) References Cited

U.S. PATENT DOCUMENTS

| | | | |
|---|---|---|---|
| 5,812,988 A * | 9/1998 | Sandretto | G06Q 40/00 702/179 |
| 5,893,091 A | 4/1999 | Hunt et al. | |
| 6,009,402 A * | 12/1999 | Whitworth | G06Q 40/08 705/400 |
| 6,014,645 A * | 1/2000 | Cunningham | G06Q 40/00 235/379 |
| 6,058,379 A * | 5/2000 | Odom | G06Q 40/04 705/37 |
| 6,313,833 B1 * | 11/2001 | Knight | G06Q 40/06 705/37 |
| 6,314,468 B1 | 11/2001 | Murphy et al. | |
| 6,345,090 B1 * | 2/2002 | Walker | G06Q 40/04 379/114.03 |
| 6,532,460 B1 | 3/2003 | Amanat et al. | |
| 6,763,384 B1 | 7/2004 | Gupta et al. | |
| 6,954,758 B1 * | 10/2005 | O'Flaherty | G06Q 30/02 707/999.102 |
| 6,957,199 B1 | 10/2005 | Fisher | |
| 7,035,819 B1 | 4/2006 | Gianakouros et al. | |
| 7,096,494 B1 | 8/2006 | Chen | |
| 7,107,240 B1 | 9/2006 | Silverman et al. | |
| 7,165,037 B2 * | 1/2007 | Lazarus | G06Q 30/0269 705/7.31 |
| 7,310,620 B2 | 12/2007 | Moore et al. | |
| 7,340,430 B2 | 3/2008 | Mulinder et al. | |
| 7,376,431 B2 * | 5/2008 | Niedermeyer | G07C 9/22 379/189 |
| 7,430,533 B1 | 9/2008 | Cushing | |
| 7,512,557 B1 | 3/2009 | Fishbain et al. | |
| 7,584,141 B1 | 9/2009 | Andrews | |
| 7,624,063 B1 | 11/2009 | Andrews | |
| 7,668,767 B1 | 2/2010 | Borsand | |
| 7,778,915 B2 | 8/2010 | Angle et al. | |
| 7,860,796 B2 | 12/2010 | Levy | |
| 7,958,033 B2 | 6/2011 | Wardley et al. | |
| 8,095,452 B2 | 1/2012 | Doornebos et al. | |
| 8,104,678 B2 * | 1/2012 | Yoshikawa | G06Q 20/4037 235/492 |
| RE43,435 E * | 5/2012 | Krause | G06Q 40/06 705/37 |
| 8,219,482 B2 * | 7/2012 | Neri | G06Q 40/04 705/37 |
| 8,234,201 B1 * | 7/2012 | Canabarro | G06Q 40/06 705/36 R |
| 8,412,605 B2 * | 4/2013 | Griffin | G06Q 40/02 705/76 |
| 8,452,681 B2 * | 5/2013 | Clements | G06Q 40/04 705/37 |
| 8,825,456 B2 * | 9/2014 | Vasudevan | G06T 7/521 703/2 |
| 8,838,495 B2 | 9/2014 | Kittelsen | |
| 9,026,470 B2 | 5/2015 | Nunes et al. | |
| 9,176,789 B2 * | 11/2015 | Lowes | G06F 9/5083 |
| 9,727,916 B1 | 8/2017 | Montesano | |
| 9,760,910 B1 * | 9/2017 | Tuchman | G06Q 50/01 |
| 10,002,388 B2 | 6/2018 | Farnstrom | |
| 10,810,669 B2 | 10/2020 | Nunes | |
| 10,958,211 B1 * | 3/2021 | Sarwat | H02J 3/004 |
| 10,977,110 B2 * | 4/2021 | Matei | G06N 5/01 |
| 11,080,785 B1 | 8/2021 | Co | |
| 2002/0038270 A1 | 3/2002 | Shin et al. | |
| 2002/0082967 A1 | 6/2002 | Kaminsky | |
| 2002/0087454 A1 | 7/2002 | Caio et al. | |
| 2002/0111896 A1 | 8/2002 | Ben-Levy et al. | |
| 2002/0161677 A1 * | 10/2002 | Zumbach | G06Q 40/00 707/E17.001 |
| 2002/0184134 A1 * | 12/2002 | Olsen | G06Q 40/06 705/37 |
| 2002/0184237 A1 | 12/2002 | Mcfeely | |
| 2003/0009419 A1 | 1/2003 | Chavez et al. | |
| 2003/0033239 A1 | 2/2003 | Gilbert et al. | |
| 2003/0041000 A1 | 2/2003 | Zajac et al. | |
| 2003/0041006 A1 | 2/2003 | Bunda | |
| 2003/0055768 A1 | 3/2003 | Anaya et al. | |
| 2003/0097327 A1 | 5/2003 | Anaya et al. | |
| 2003/0139990 A1 | 7/2003 | Greco et al. | |
| 2003/0149648 A1 * | 8/2003 | Olsen | G06Q 40/00 705/35 |
| 2003/0236738 A1 | 12/2003 | Lange et al. | |
| 2004/0059666 A1 | 3/2004 | Waelbroeck et al. | |
| 2004/0139031 A1 | 7/2004 | Amaitis et al. | |
| 2004/0243503 A1 | 12/2004 | Eng et al. | |
| 2004/0260553 A1 | 12/2004 | Neimi et al. | |
| 2005/0010475 A1 | 1/2005 | Perkowski et al. | |
| 2005/0044035 A1 | 2/2005 | Scott | |
| 2005/0154668 A1 | 7/2005 | Burns | |
| 2005/0171887 A1 | 8/2005 | Daley et al. | |
| 2005/0171891 A1 | 8/2005 | Daley et al. | |
| 2005/0187854 A1 * | 8/2005 | Cutler | G06Q 40/04 705/37 |
| 2005/0192899 A1 * | 9/2005 | Reardon | G06Q 40/00 705/40 |
| 2005/0203825 A1 | 9/2005 | Angle | |
| 2005/0228735 A1 | 10/2005 | Duquette et al. | |
| 2005/0251448 A1 | 11/2005 | Gropper | |
| 2005/0273418 A1 | 12/2005 | Campbell | |
| 2006/0047590 A1 | 3/2006 | Anderson et al. | |
| 2006/0195391 A1 * | 8/2006 | Stanelle | G06Q 40/02 705/38 |
| 2006/0265317 A1 | 11/2006 | Duquette et al. | |
| 2006/0271475 A1 | 11/2006 | Brumfield et al. | |
| 2007/0156919 A1 | 7/2007 | Potti et al. | |
| 2007/0244795 A1 * | 10/2007 | Lutnick | G06Q 40/04 705/37 |
| 2008/0015970 A1 | 1/2008 | Brookfield et al. | |
| 2008/0059846 A1 | 3/2008 | Rosenthal | |
| 2008/0086352 A1 | 4/2008 | Hibbert | |
| 2008/0086401 A1 | 4/2008 | Mather | |
| 2008/0228617 A1 | 9/2008 | Johnson | |
| 2008/0235146 A1 | 9/2008 | Hirani et al. | |
| 2008/0243675 A1 | 10/2008 | Parsons | |
| 2008/0255910 A1 * | 10/2008 | Bagchi | G06Q 10/0635 705/7.28 |
| 2008/0281750 A1 | 11/2008 | Toffey et al. | |
| 2008/0288326 A1 * | 11/2008 | Abramowicz | G06Q 30/0605 705/7.29 |
| 2008/0288390 A1 | 11/2008 | Maynard | |
| 2008/0288889 A1 * | 11/2008 | Hunt | G06Q 30/02 715/810 |
| 2008/0301019 A1 * | 12/2008 | Monk | G06Q 20/4016 705/35 |
| 2009/0024539 A1 * | 1/2009 | Decker | G06Q 40/06 705/36 R |
| 2009/0234776 A1 | 9/2009 | Bauershmidt et al. | |
| 2009/0271325 A1 | 10/2009 | Wilson | |
| 2009/0292649 A1 | 11/2009 | Somech et al. | |
| 2009/0319417 A1 | 12/2009 | Littlewood | |
| 2010/0023460 A1 * | 1/2010 | Hughes | G06Q 40/06 705/36 R |
| 2010/0094743 A1 | 4/2010 | Robertson et al. | |
| 2010/0185559 A1 | 7/2010 | May | |
| 2010/0312701 A1 * | 12/2010 | Bosch | G07F 19/20 705/43 |
| 2010/0312718 A1 | 12/2010 | Rosenthal | |
| 2010/0332368 A1 | 12/2010 | Alderucci et al. | |
| 2011/0125672 A1 | 5/2011 | Rosenthal et al. | |
| 2011/0145149 A1 * | 6/2011 | Valdes | G06Q 20/10 705/44 |
| 2011/0166982 A1 | 7/2011 | Cole et al. | |
| 2011/0178912 A1 * | 7/2011 | Parsons | G06Q 40/04 705/35 |
| 2011/0213731 A1 * | 9/2011 | Cho | G06Q 50/16 705/36 R |
| 2011/0225081 A1 | 9/2011 | Kittleson et al. | |
| 2011/0264581 A1 * | 10/2011 | Clyne | G06Q 20/10 705/39 |
| 2012/0029956 A1 * | 2/2012 | Ghosh | G06Q 10/063 705/7.11 |
| 2012/0030154 A1 * | 2/2012 | Nicholson | G01S 7/003 703/2 |

(56) References Cited

U.S. PATENT DOCUMENTS

| | | |
|---|---|---|
| 2012/0041898 A1 | 2/2012 | Shah |
| 2012/0233050 A1 | 9/2012 | Sheldon |
| 2012/0233051 A1 | 9/2012 | Sheldon |
| 2012/0278254 A1* | 11/2012 | Rosenthal ............... G06Q 40/06 705/36 R |
| 2012/0323764 A1* | 12/2012 | Boberski ................ G06Q 40/04 705/39 |
| 2012/0330817 A1 | 12/2012 | Brkic |
| 2013/0024395 A1* | 1/2013 | Clark ..................... G06Q 40/06 705/36 R |
| 2013/0226764 A1* | 8/2013 | Battyani ................ G06Q 40/04 705/37 |
| 2013/0226771 A1 | 8/2013 | Lassus |
| 2014/0156491 A1* | 6/2014 | Koh ....................... G06Q 40/04 705/37 |
| 2014/0229353 A1* | 8/2014 | Lutnick ................. G06Q 40/04 705/37 |
| 2015/0106251 A1 | 4/2015 | Farnstrom |
| 2015/0154284 A1* | 6/2015 | Pfeifer ................ G06F 16/3344 707/723 |
| 2016/0314425 A1* | 10/2016 | Cunningham ... G06Q 10/06398 |
| 2016/0328798 A1 | 11/2016 | Thakkar |
| 2016/0371779 A1* | 12/2016 | Stearns .................. G06Q 40/06 |
| 2017/0032463 A1 | 2/2017 | Hunter et al. |
| 2017/0293973 A1 | 10/2017 | Lustyk |
| 2017/0372423 A1 | 12/2017 | Goodman |
| 2018/0047071 A1* | 2/2018 | Hsu ..................... G06Q 30/0282 |
| 2018/0218450 A1 | 8/2018 | Ellis et al. |
| 2018/0276541 A1 | 9/2018 | Studnitzer |
| 2019/0080408 A1 | 3/2019 | Gimple |
| 2019/0130116 A1 | 5/2019 | Huo et al. |
| 2019/0318348 A1* | 10/2019 | Brenner ............. G06Q 20/1235 |
| 2019/0370716 A1* | 12/2019 | Kavumpurath ..... G06F 16/2458 |
| 2019/0379642 A1* | 12/2019 | Simons ............... H04L 63/0281 |
| 2020/0019288 A1* | 1/2020 | D'Amore ............. H04L 9/3239 |
| 2020/0065900 A1 | 2/2020 | Wiesner |
| 2020/0143367 A1* | 5/2020 | LeBeau ................ G06F 21/64 |
| 2020/0175623 A1* | 6/2020 | Howie ................. G06Q 50/18 |
| 2020/0267163 A1* | 8/2020 | Wilson ................. H04L 9/3271 |
| 2021/0065294 A1 | 3/2021 | Trevathan |
| 2021/0110477 A1* | 4/2021 | Spangenberg ......... G06Q 20/36 |
| 2021/0192616 A1 | 6/2021 | Millhuff |
| 2021/0264520 A1* | 8/2021 | Cummings ............ G06Q 40/12 |
| 2022/0058735 A1* | 2/2022 | Chuzhoy ................ G06Q 40/04 |
| 2022/0129980 A1* | 4/2022 | Son ....................... H04L 9/3239 |
| 2022/0309475 A1* | 9/2022 | Kurniawan ........... G06F 16/248 |
| 2022/0414726 A1* | 12/2022 | Kerber ..................... H04L 9/50 |
| 2023/0116345 A1* | 4/2023 | Chirochangu ..... G06Q 10/0635 705/7.28 |
| 2023/0298117 A1* | 9/2023 | Barlow .................. G06Q 50/26 705/41 |

FOREIGN PATENT DOCUMENTS

| | | |
|---|---|---|
| CN | 101449286 | 6/2009 |
| CN | 105556548 | 5/2016 |
| CN | 109272323 | 1/2019 |
| CN | 110414980 | 11/2019 |
| EP | 1118953 | 7/2001 |

OTHER PUBLICATIONS

International Search Report for PCT/US08/07025, mailed Aug. 20, 2008.
Non-Final Office Action in U.S. Appl. No. 17/386,900, dated Jun. 8, 2022, 26 pages.
Notification of Transmittal of International Preliminary Report and Written Opinion for International Application No. PCT/US10/47394 mailed Oct. 22, 2010.
Notification of Transmittal of International Preliminary Report and Written Opinion for International Application No. PCT/US10/54538 mailed Jan. 4, 2011.
Office Action mailed Jul. 28, 2010 in co-pending U.S. Appl. No. 12/131,921.
Office Action mailed Nov. 9, 2010 in co-pending U.S. Appl. No. 12/131,921.
Office Action mailed Oct. 15, 2012 in co-pending U.S. Appl. No. 12/873,148.
Office Action mailed Oct. 9, 2012 in co-pending U.S. Appl. No. 12/914,699.
Office Action mailed Sep. 9, 2010 in co-pending U.S. Appl. No. 12/836,943.
U.S. Appl. No. 12/836,943, filed Aug. 31, 2010; Inventor: Angle et al.
U.S. Appl. No. 12/873,148, filed Aug. 31, 2010; Inventor: Cole et al.
Written Opinion of the International Searching Authority for PCT/US08/07025, mailed Aug. 20, 2008.

* cited by examiner

EXCHANGE RISK CONTROLS

CROSS-REFERENCE TO RELATED APPLICATIONS

This patent application is a continuation (and claims the benefit of priority under 35 USC 120) of U.S. patent application Ser. No. 17/386,900, filed Jul. 28, 2021, which is a continuation (and claims the benefit of priority under 35 USC 120) of U.S. patent application Ser. No. 16/881,711, filed May 22, 2020 and now U.S. Pat. No. 11,710,181 B1, which claims the benefit of U.S. Provisional Application No. 62/959,731, filed Jan. 10, 2020, U.S. Provisional Patent Application No. 62/967,303, filed Jan. 29, 2020, and U.S. Provisional Patent Application No. 63/021,518, filed May 7, 2020, all of which are incorporated herein by reference in their entirety.

TECHNICAL FIELD

This application relates to technology for trading financial instruments in electronic exchanges, as well as hybrid exchanges that combine electronic and open-outcry trading mechanisms.

BACKGROUND

High volumes of financial instruments such as derivatives, stocks, and bonds are continuously traded at electronic exchanges, which enable trades to occur in real time through the algorithmic processing of orders and associated market information. Generally, a trade may be executed when the price associated with a bid to purchase a financial instrument matches the price associated with an offer to sell the same instrument. Market participants typically price their bids and offers based on market conditions, which are subject to rapid change. Consequently, would-be buyers and sellers expose themselves to financial risk during the pendency of their orders, and can experience substantial losses if they are unable to cancel pending orders quickly enough in reaction to changing market conditions. Accordingly, there is a need for technology that enables market participants to rapidly identify and react to changing market conditions, so as to mitigate risks associated with pending orders.

SUMMARY

The disclosure that follows relates to risk controls implemented via an exchange computer system. The disclosed controls enable system users to rapidly identify and react to changing market conditions, thereby mitigating risks associated with pending orders.

In one aspect, a method for managing risk implemented via an exchange computer system includes receiving, from a user device, a risk profile that includes a risk threshold. The exchange computer system determines that a set of one or more security transaction orders are associated with the risk profile, and uses one or more processors to monitor the one or more security transaction orders included in the set. The system determines, based on the monitoring, that the risk threshold is satisfied and, in response to that determination, cancels the one or more security transaction orders included in the set.

In some implementations, the system may alert a user associated with the risk profile that the risk threshold is satisfied. In some implementations, the system may determine, based on the monitoring, that a sub-threshold associated with the risk threshold is satisfied, and alert a user associated with the risk profile that the sub-threshold associated with the risk threshold is satisfied. The sub-threshold may correspond to a first risk level and the risk threshold corresponds to a second risk level.

The method for managing risk may include receiving one or more order messages that associate the one or more security transaction orders with the risk profile. The one or more order messages may be received from the user device, which may be local to, or remote from, the exchange computer system. The exchange computer system may be a distributed computer system that includes an order routing system configured to route a securities order according to a destination of the securities message, an order matching system configured to match a securities order to a bid or offer according to one or more matching rules, a risk engine, an order entry port configured to receive a security order and to provide the security order to one or more processors in the system, and a purge port configured to cancel the one or more security transaction orders included in the set in response to receiving a cancellation signal.

The method may include receiving a second risk profile that includes a second risk threshold. The exchange computer system determines that a second set of one or more security transaction orders are associated with the second risk profile, monitors the one or more security transaction orders included in the second set, and facilitates one or more security transactions based on the one or more security transaction orders included in the second set. In some examples, the risk profile is associated with a user, and the second risk profile is associated with the same user. The method may include determining that the second risk threshold is not satisfied.

According to some aspects, an exchange computer system includes one or more processors and one or more storage devices. The one or more storage devices store instructions that are operable, when executed by the one or more processors, to cause the one or more processors to perform operations. The operations include receiving, from a user device, a risk profile that includes a risk threshold, and determining that a set of one or more security transaction orders are associated with the risk profile. The one or more processors monitor the one or more security transaction orders included in the set, and determine, based on the monitoring, that the risk threshold is satisfied. In response to determining that the risk threshold is satisfied, the one or more processors cancel the one or more security transaction orders included in the set.

According to some aspects, a non-transitory computer-readable storage medium includes instructions, which, when executed by one or more computer processors in an exchange computer system, cause the one or more computer processors to perform operations. The operations include receiving, from a user device, a risk profile that includes a risk threshold, and determining that a set of one or more security transaction orders are associated with the risk profile. The one or more computer processors monitor the one or more security transaction orders included in the set, and determine, based on the monitoring, that the risk threshold is satisfied. In response to determining that the risk threshold is satisfied, the one or more computer processors cancel the one or more security transaction orders included in the set.

According to some aspects, a method for managing risk implemented via an exchange computer system is described. The method includes receiving data indicative of one or more parameters for configuring a risk profile, generating the risk profile based on the data indicative of the one or more parameters, and assigning a tag to one or more security transaction orders to associate the one or more security transaction orders with the risk profile. The exchange computer system monitors market data indicative of market conditions, and determines, based on the monitoring, that a notional value indicated by the market data satisfies a risk threshold of the risk profile. In response to determining that the risk threshold is satisfied, the exchange computer system cancels the one or more security transaction orders.

The one or more parameters may include a type of order to be associated with the risk profile, a time period for implementing the risk profile, and a threshold limit for a notional threshold. The system may store the risk profile and the data indicative of the one or more parameters for configuring the risk profile in a storage device.

In some implementations, assigning the tag to the one or more security transaction orders to associate the one or more security transaction orders with the risk profile may include the operations of receiving an order message indicating user selection of the one or more security transaction orders to be associated with the risk profile, or determining that a feature of the one or more security transaction orders satisfies a criterion for associating an order with the risk profile. The operation of monitoring the market data indicative of the market conditions may include monitoring a price or volume of a security instrument.

In some implementations, determining, based on the monitoring, that the notional value indicated by the market data satisfies the risk threshold of the risk profile may include determining that the notional value indicated by the market data is equal to or exceeds a notional threshold in the risk profile. The operation of canceling the one or more security transaction orders included in the set comprises may include utilizing a purge port to cancel the one or more security transaction orders, and transmitting a notification to a user device that the one or more security transaction orders have been canceled. In some implementations, the operation of canceling the one or more security transaction orders included in the set may be executed by the risk engine, which may cancel the orders in response to determining that the risk threshold is satisfied.

The method for managing risk implemented via an exchange computer system may also include the operations of receiving data indicative of one or more risk sub-thresholds, and configuring the risk profile to include the one or more risk sub-thresholds. Each of the one or more risk sub-thresholds corresponds to a risk level below a risk level corresponding to the risk threshold. Based on the monitoring, the exchange computer system may determine that a market condition indicated by the market data satisfies the one or more risk sub-thresholds, and may transmit one or more messages to a user device indicating that the one or more risk sub-thresholds have been satisfied.

Certain implementations may provide various advantages. For example, the disclosed risk controls enable users to define and employ risk thresholds on an order-by-order basis. This allows for the rapid cancelation of pending orders associated with a particular threshold upon that threshold's breach or leading up to the threshold's breach, while orders associated with different thresholds remain open. This granular approach to risk control and the associated data structures dramatically improve the speed and computational efficiency of order cancelation, which can otherwise be computationally intensive. Moreover, the granularity enables users to employ multiple risk strategies that are tailored to particular needs and positions, and to rapidly react to changing market conditions.

The risk controls also advantageously protect investors and public interests through real-time risk mitigation and risk minimization. The implementation of the disclosed risk management techniques would, for example, enhance the integrity of trading on the securities markets, and thereby help to assure the stability of the financial system.

Other implementations of this aspect include corresponding systems, devices, processes, apparatus, computer-readable media, and computer programs recorded on computer storage devices, each configured to perform the operations of the methods.

The details of one or more embodiments of the subject matter described in this specification are set forth in the accompanying drawings and the description below. Other potential aspects, features, and advantages will be apparent from the description, the drawings, and the claims.

DETAILED DESCRIPTION

Figure 1:
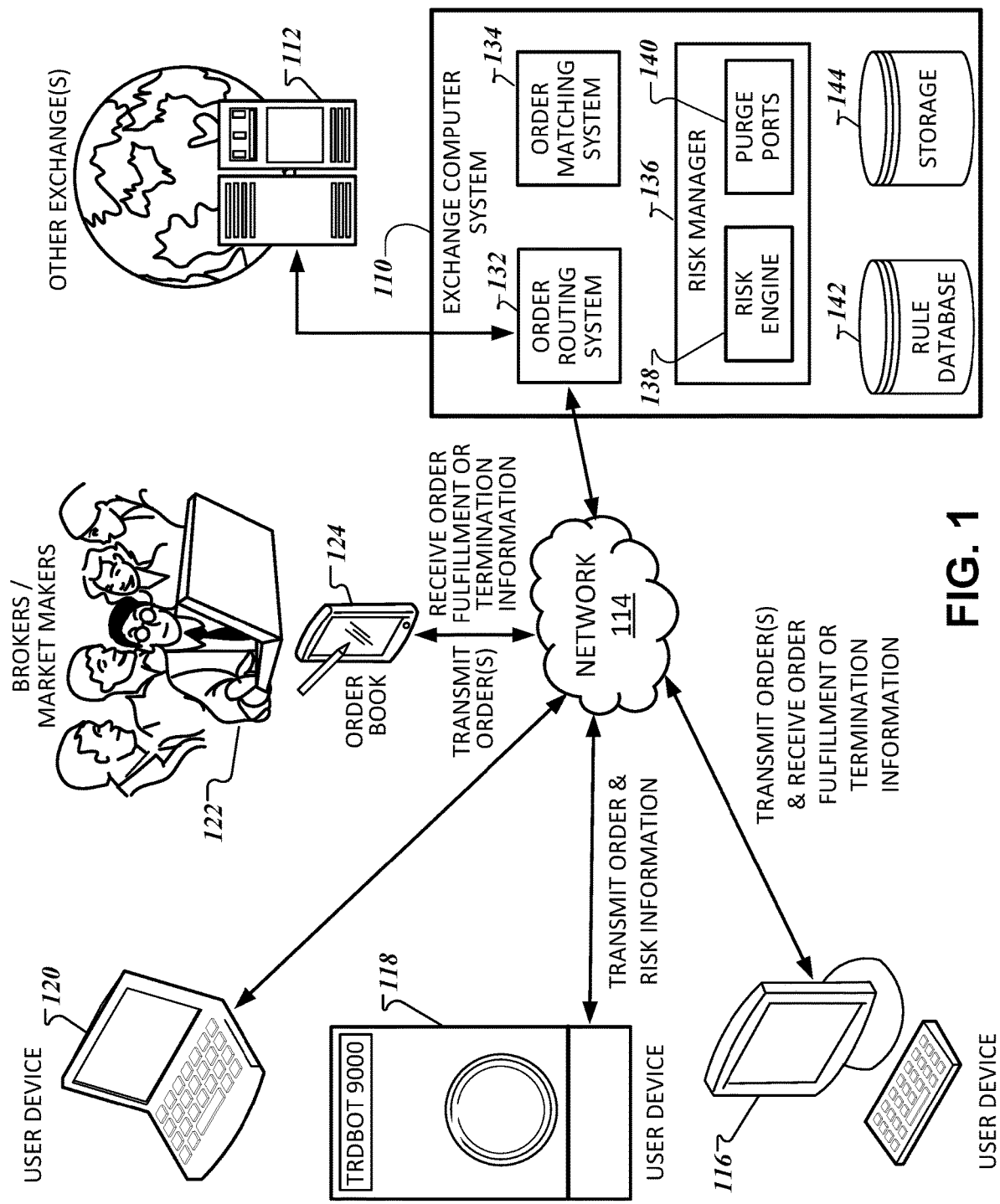
FIG. 1 is an example diagram of an exchange computer system and associated networks, devices, and users.

FIG. 1 is an example diagram of an exchange computer system and the associated networks, devices, and users that make up an exemplary trading environment in which that system operates. The diagram includes an exchange computer system 110, other exchanges 112, a network 114, user devices 116, 118, 120, market makers/brokers 122, and an electronic order book 124. Generally, the term "user" may refer to any entity that interacts with the exchange computer system and/or associated networks and devices. Users may include, for example, market makers and other market professionals, brokers, institutional traders, individual traders, and automated trading systems.

In some cases, a user may refer to a member, as defined under exchange rules, or a clearing member, who is a member of a Qualified Clearing Agency authorized to clear transactions on behalf of another member, as defined under exchange rules. If a clearing member is the user, the clearing member may be required to request authorization from the exchange control system 110 to receive data indicative of a current or previous risk profile setting of the member on behalf of whom the clearing member is acting.

The exchange computer system 110 may be implemented in a fully electronic manner, or in a hybrid manner that combines electronic trading with aspects of traditional open-outcry systems. The exchange computer system 110 may receive orders for trading financial instruments locally on the floor and from remote electronic devices. The financial instruments may include securities such as stocks, options, futures, or other derivatives associated with an underlying asset.

Network 114 connects the various components within the trading environment, and is configured to facilitate communications between those components. Network 114 may, for example, be configured to enable the exchange of electronic communications that include order and order fulfillment information between connected devices, such as an electronic order book 124 and the exchange computer system 110.

Network 114 may include one or more networks or subnetworks, each of which may include a wired or wireless data pathway. Network 114 may, for example, include one or more of the Internet, Wide Area Networks (WANs), Local Area Networks (LANs), or other packet-switched or circuit-switched data networks that are capable of carrying electronic communications (e.g., data or voice communications).

To protect communications between the various systems, devices, and components connected to network 114, network 114 may implement security protocols and measures such that data identifying order or bid information, or parties placing orders or quotes, may be securely transmitted. Network 114 may, for example, include virtual private networks (VPNs) or other networks that enable secure connections to be established with exchange computer system 110.

User devices 116, 118, and 120 may include portable or stationary electronic devices, such as smartphones, laptops, desktops, and servers that include user interfaces to display information and receive user input, and that are configured to communicate over a computer network. User devices 116, 118, and 120 may communicate with the exchange computer system 110 over network 114 using a proprietary protocol, or a message-based protocol such as financial information exchange (FIX), implemented over TCP/IP.

User devices 116, 118, and 120 may transmit user input such as order information or risk information to the exchange computer system 110, and may also receive data from the exchange computer system 110 indicating that an order has been filled or canceled.

Users such as brokers/market makers 122 may also place orders and receive information about order fulfillment or termination through electronic order book 124, which may include a record of outstanding public customer limit orders that can be matched against future incoming orders.

The exchange computer system 110 includes an order routing system (ORS) 132, an order matching system (OMS) 134, a risk manager 136 that includes a risk engine 138, purge ports 140, order entry ports, a database of trading rules and algorithms 142, and storage 144.

The order routing system (ORS) 132 determines whether a received order or quote is to be executed at the exchange computer system 110, or should instead be redirected to another exchange 112, and includes processing systems that enable the management of high data volumes. The ORS 132 may, for example, receive order or quote information for the purchase or sale of financial instruments from one or more user devices 116, 118, 120, and 124. In some implementations, the ORS 132 may also be connected to or include a touch-screen order routing and execution system accessible by brokers on the exchange floor, such as a public automated routing (PAR) system.

Upon receiving an order or quote, the ORS 132 determines if the destination specified in the received order or quote is the exchange computer system 110. If the exchange computer system 110 is not the destination, the ORS 132 forwards the order or quote to another exchange 112, which may be either the destination exchange, or an exchange en route to the destination exchange.

If the ORS 132 determines that the exchange computer system 110 is the destination of the received order or quote, the ORS 132 may forward the received order or quote to the order matching system 134. The ORS 132 may include or be connected to an order entry port which receives the order and forwards the received order to the order matching system 134.

The order matching system (OMS) 134 includes processing systems that analyze and manipulate orders according to matching rules stored in the database 142. The OMS 134 may also include an electronic book (EBOOK) of orders and quotes with which incoming orders to buy or sell are matched, according to the matching rules. The EBOOK may also be implemented in a separate database such as storage 144, which may include multiple mass storage memory devices for the storage of order and quote information. When the OMS 134 determines that a match exists for an order (for example, when a bid matches an offer for sale), the order matching system 134 may mark the matched order or quote with a broker-specific identifier so that the broker sending the order or quote information can be identified.

Storage 144 and database 142 store and handle data in a manner that satisfies the privacy and security requirements of the exchange computer system 110 and its users, and may store one or more of telemetric data, user profiles, user history, and rules and algorithms for matching quotes, bids, and orders.

Upon completion of a trade (through the floor in open outcry as entered into the PAR system, or through automatic execution through the OMS 134), the fill information is passed through OMS 134 and ORS 132 to one or more user devices 116, 118, 120, and 124, and to a continuous trade match (CTM) system. The CTM system matches the buy side and sell side of a trade, and forwards the matched trade to a third party organization that verifies the proper clearance of the trade, such as the Options Clearing Corporation (OCC) where the securities may be options, or the Depository Trust Company (DTC) where the securities may be equities. The OMS 134 also formats the quote and sale update information and sends that information through an internal distribution system that refreshes display screens on the floor, in addition to submitting the information to a quote and trade dissemination service such as, in the case of options, the Options Price Reporting Authority (OPRA). In the case of equities, the information would be submitted to the Securities Information Processor (SIP).

The exchange computer system 110 includes a risk manager 136 that facilitates risk-management in the trading of financial instruments. The risk manager 136 may include a risk engine 138 and one or more purge ports 140. The risk engine 138 may be implemented using a combination of software and hardware. The risk engine 138 may, for example, be implemented as a hardware processor configured to execute one or more algorithms for managing risk, as described in further detail below.

The risk manager 136 may include or be connected to a user interface in the form of a risk management gateway through which a user can optionally create risk profiles, and may transmit and receive associated information through network 114, to and from user devices 116, 118, 120, and/or 124. The risk management gateway may, for example, be implemented through a Secure Web API and/or a dedicated user portal. In some implementations, the user interface may be connected to, or implemented as, a web portal of the exchange computer system 110.

Figure 2:
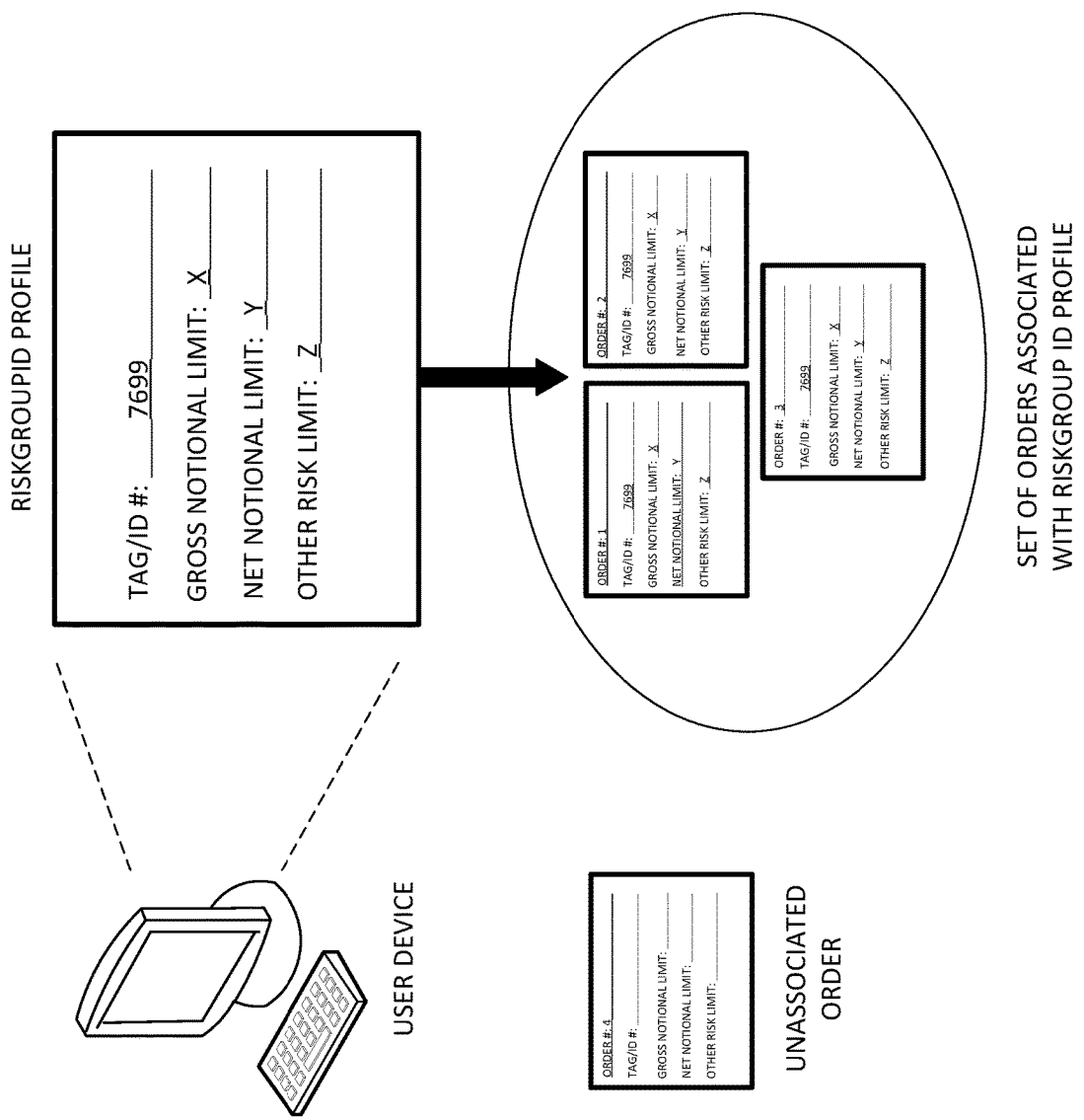
FIG. 2 is an example diagram of a risk profile and associated orders.

FIG. 2 is an example diagram of a risk profile and associated orders. In more detail, FIG. 2 depicts an exemplary risk management gateway generated by the risk manager 136, as viewed on user device 116. As shown, the associated user interface enables the user to provide information for generating a risk profile (RiskGroup ID Profile), e.g., by providing values for parameters used to configure the user risk profile. In this manner, the user can specify a risk strategy that is associated with the user, and that may be applied to one or more of the user's orders. The parameters may include, but are not limited to: a type of order or a particular order the user is interested in associating with the risk profile; a time period for implementing the risk profile; one or more threshold limits that may include a range of values or a particular value associated with a net notional or gross notional threshold; a range of values or a particular value associated with a gross credit risk limit; a range of values or a particular value associated with a net credit risk limit; and, in general, any other parameter that reflects the user's preferences for a risk profile.

After receiving the information for generating a risk profile and from the user, the risk manager 136 may generate and store the user's risk profile, which may, for example, be applied on an order-by-order basis, as a tag or ID number included in new order messages sent from user device 116 to exchange computer system 110. In particular, the risk manager 136 may identify an order or a set of orders based on the tags or RiskGroup ID Profile numbers included in the user's order messages, and may further group orders together based on any pre-defined criteria and/or risk limits that the user requires (for example, per side, per asset, per capital-at-risk, and per quantity).

In this manner, risk manager 136 provides the user with granular risk control that enables the user to generate a risk strategy involving specific risk thresholds, and to associate that strategy with particular orders. For example, a member of the exchange might submit a first set of orders that are associated with a first risk profile implementing a first strategy, and a second set of orders that are associated with a second risk profile implementing a second strategy. The first and second strategies might involve different levels of risk tolerance, and the use of first and second risk profiles enables the user to independently set risk thresholds for those strategies, and to tag orders for association with those thresholds within the exchange computer system.

The use of risk profiles and associated data structures enables cancelation to occur within the exchange computer system 110, avoiding the need for multiple cancelation instructions to be transmitted from a user device through network 114, greatly increasing the speed with which cancelation can be processed. Indeed, if the risk threshold for the user's first strategy is satisfied, the system can instantly cancel all orders associated with the first profile, while orders associated with the second profile (and any other non-first profile orders) remain pending.

Moreover, by surgically canceling orders that match or exceed individually-defined risk thresholds, it is less likely that a user's aggregate risk threshold will be triggered (which would result in a mass cancelation of all of the user's pending orders, including orders that the user likely would not want to cancel). In addition to economic benefits to the user, the avoidance of mass cancelation greatly improves computational resource efficiency within the exchange computer system.

In the example shown in FIG. 2, the user has specified a risk strategy that has a particular gross notional limit and net notional limit, and has identified a set of three orders for association with that risk strategy, while leaving a fourth order unassociated.

After a user completes providing the information for creating a RiskGroupID profile, the associated data may be transmitted from user device 116 to risk engine 138, which processes that data. The risk engine 138 may generate the RiskGroupID profile, associate a new order with a particular risk profile based on a tag or identifier assigned to the order by the user. The risk engine 138 stores the RiskGroupID profile and the conditions and parameter values associated with each RiskGroupID profile in a storage device (e.g., a read-only memory, random access memory, and/or magnetic disks such as internal hard disks and removable disks).

In addition, the exchange computer system 110 may continuously or periodically receive market data indicative of market conditions such as the market price or volume of certain financial security instruments being traded. The risk engine may monitor market data to determine if any of the conditions specified in a given profile have been satisfied. If, for instance, a particular RiskGroupID profile specifies a gross notional limit, and market data indicates that the specified gross notional limit has been satisfied, then the risk engine 138 will determine that the order(s) associated with the particular RiskGroupID profile should be canceled, and may also alert the user. More generally, the risk engine 138 may evaluate all market data to determine if one or more risk thresholds specified in the RiskGroupID profile have been satisfied, i.e., equaled or exceeded.

The risk manager 136 also includes one or more purge ports 140, which may be used to cancel one or more sets of orders. In general, a purge port may refer to a dedicated port that permits a user to simultaneously cancel all or a subset of its orders in one or more symbols across multiple logical ports by requesting the exchange computer system 110 to effect such cancellation. For example, in some implementations, the risk manager 136 may generate and send instructions to a purge port to cancel orders that are associated with a particular RiskGroupID profile, upon a determination and user notification by risk engine 138 that the profile has satisfied a previously defined limit (e.g., a net notional or gross notional limit). A user may be able to specify the manner in which notification occurs. For example, a user may select a desired mechanism of receiving notifications such as receiving e-mail notifications, phone call notifications, text message notifications, fax notifications, or, in general, other suitable mechanisms for securely transmitting messages. In some instances, a user may opt for cancelation without prior notification, upon a determination the previously defined limit has been satisfied. In others, the user may specify that cancelation only takes place after the user has been notified (e.g., alerted), and following receipt of a message indicating user approval. A user may also specify particular sub-thresholds upon which notification will occur.

The risk manager 136 may, for example, notify the user upon determining that the level of risk exceeds one or more sub-thresholds of the risk limit (e.g., 50%, 70%, and/or 90%, although other percentages are possible). The sub-thresholds may be set by default, or according to instructions provided by the user during creation of the RiskGroupID profile. The risk manager 136 may then monitor the market conditions and send updates when certain sub-thresholds are satisfied. For instance, the exchange system 110 may send notifications to the user indicating that the risk limit is 50%, 70%, or 90% satisfied. In this manner, the user is kept informed of market conditions, so as to lessen any surprise associated with cancelation of orders.

In some implementations, a user may be required to validate a RiskGroupID Profile before orders may be tagged according to the risk strategy specified in that RiskGroupID Profile. For example, user IDs, passwords, biometric data, or other suitable security information may be used to validate the creation of a RiskGroupID Profile. A member may be further able to enforce the use of one or more RiskGroupID Profiles by associated users, thereby limiting risk across sessions.

Figure 3:
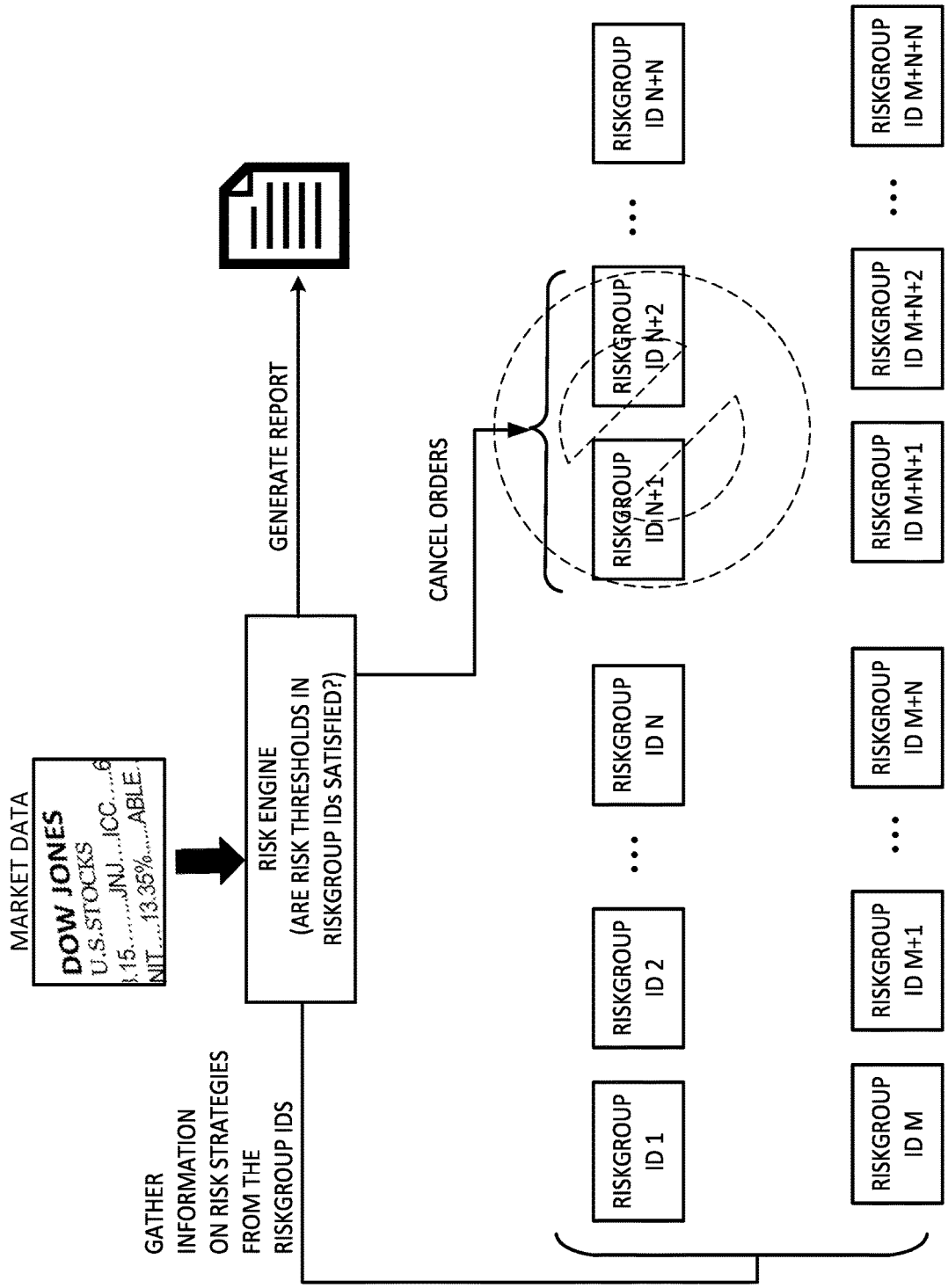
FIG. 3 is an example diagram of order cancelation based on a risk profile.

FIG. 3. is an example diagram of order cancelation based on a risk profile. In more detail, FIG. 3 depicts an example in which the risk engine 138 has received multiple RiskGroupID profiles from one or more user devices 116, 118, 120, and 124. The risk engine 138 assigns RiskGroupID profiles to particular orders, and monitors market data to determine whether orders that have been tagged for association with one or more of the RiskGroupID profiles should be canceled.

In the example shown in FIG. 3, the risk engine 138 determines that the net notional limit of a security's underlying asset as specified by RiskGroupID profiles N+1 and N+2 has been reached. In response to determining that this limit has been reached, the risk engine determines that all orders associated with those profiles should be canceled. For example, the risk engine 138 may determine that RiskGroupID profiles N+1 and N+2 are associated with purge port 2, and may send an instruction to purge port 2 to cancel all orders associated with RiskGroupID profiles N+1 and N+2. Alternatively, the risk engine 138 may bypass purge port 2 by executing operations to cancel all orders associated with RiskGroupID profiles N+1 and N+2, without sending an instruction to purge port 2.

After the orders have been canceled, the exchange computer system 110 may generate an update indicating that the cancelation has taken place, and may provide that update to other exchanges 112 and to user devices 116, 118, 120, and 124, thereby ensuring that all parties have up-to-date information regarding available offers and quotes.

In some implementations, the exchange computer system 110 may also, periodically or upon request by a user, generate a user report including information regarding trades impacted by the user's risk strategies, and/or information regarding risk strategies and controls that are available to the user, but that are not being utilized by the user. These reports may enable users to monitor, manage, and improve their risk management strategies over time.

Various number of purge ports may be utilized to cancel orders, and one or more RiskGroupID profiles may be assigned to each purge port. In some implementations, the risk manager 136 may set a limit on the number of RiskGroupID profiles that can be assigned to each purge port. Alternatively, the risk engine 138 may cancel orders without reliance on purge ports.

Although embodiments of the present disclosure have been described in detail, it should be understood that the various changes, substitutions, and alterations could be made hereto without departing from the spirit and scope of the present disclosure. Thus, particular implementations have been described. Other implementations are within the scope of the following claims. For example, the actions recited in the claims may be performed in a different order and still achieve desirable results.

What is claimed is:

1. A system comprising:
an order routing system configured to receive one or more electronic transaction orders from a user device over a computer network;
an order matching system configured to match a buy side and sale side of a purchase or sale of an asset in the one or more electronic transaction orders;
an engine processor configured to receive (i) market data indicative of market conditions and, (ii) one or more parameters including a first threshold from the user device over the computer network, wherein the engine processor is configured to:
generate user information based on the one or more parameters received from the user device;
determine whether a first value indicated by the market data satisfies the first threshold provided in the user information;
determine whether the first threshold is satisfied;
in response to determining that the first threshold is not satisfied, executing, the one or more electronic transaction orders, and transmitting information, to the user device, about the executed one or more electronic transaction orders; and
in response to determining that the first threshold is satisfied, cancel, in a first operation mode by the engine processor, the one or more electronic transaction orders in response to determining that the first threshold is satisfied, the first operation mode configured to generate and transmit cancellation instructions to the user device.

2. The system of claim 1, wherein, the one or more parameters comprising one or more of:
a type of order;
a time period for implementing the user information;
a range of values or a particular value associated with a notional threshold that is different than the first threshold; and
a value or range of values associated with a gross credit limit associated with the user information.

3. The system of claim 2, wherein the engine processor is configured to:
determine that a sub-threshold associated with the first threshold is satisfied, the sub-threshold being different than the notional threshold and the first threshold, and wherein the sub-threshold corresponds to a first level and the notional threshold corresponds to a second level that is different than the first level.

4. The system of claim 3, wherein the first level is a less than the second level.

5. The system of claim 1, wherein the engine processor is configured to:
electronically grouping, into one set, the one or more electronic transaction orders with the user information based on a pre-defined criteria in the one or more parameters received from the user device.

6. The system of claim 1, wherein the engine processor is configured to:
validate, utilizing at least one of the one or more of a user identification, biometric data, password, or security-related information, creation of the user information by the system.

7. The system of claim 5, wherein the engine processor is configured to:
receive a second user information that includes a second threshold, the second user information being different than the user information and the second threshold being different than the first threshold; and
determine that a second set of one or more electronic transaction orders are associated with the second user information, wherein the first threshold associated with the user information has one or more different values than the second threshold associated with the second user information.

8. A non-transitory computer-readable storage medium comprising instructions, which, when executed by one or more computer processors in an exchange computer system, cause the one or more computer processors to perform operations comprising:

receiving, by an exchange computer system from a user device and through a computer network, (i) market data indicative of market conditions and, (ii) one or more parameters that include a first threshold, wherein the computer network comprises a network of interconnected electronic devices, and wherein the exchange computer system comprises an engine processor, and memory configured to store the one or more parameters;

generating, by the engine processor, user information based on the one or more parameters received from the user device;

receiving one or more electronic transaction orders at the exchange computer system;

determining whether a first value, indicated by the market data, satisfies the first threshold provided in the user information;

determining, by the engine processor, whether the first threshold is satisfied;

in response to determining that the first threshold is not satisfied, executing, the one or more electronic transaction orders, and transmitting information, to the user device, about the executed one or more electronic transaction orders;

in response to determining that the first threshold is satisfied, canceling, in a first operation mode of the engine processor, the one or more electronic transaction orders in response to determining that the first threshold is satisfied, the first operation mode configured to generate and transmit cancellation instructions to the user device;

in response to cancelling the one or more electronic transaction orders, generating an electronic update indicating (i) cancelation of the one or more electronic transaction orders and (ii) indicating currently available offers and quotes for electronic transaction orders; and transmitting the electronic update to the user device or a second exchange computer system external to the exchange computer system.

9. The non-transitory computer-readable storage medium of claim 8, wherein the operations further comprise:

determining a range of values or a particular value associated with a notional threshold that is different than the first threshold; and determining that a sub-threshold associated with the notional threshold is satisfied, the sub-threshold being different than the notional threshold and the first threshold, and wherein the sub-threshold is different than the first threshold and corresponds to a first level and the notional threshold corresponds to a second level that is different than the first level.

10. A method comprising:

receiving, by an exchange computer system from a user device and through a computer network, (i) market data indicative of market conditions and, (ii) one or more parameters that include a first threshold, wherein the computer network comprises a network of interconnected electronic devices, and wherein the exchange computer system comprises an engine processor, and memory configured to store the one or more parameters received from the user device;

generating, by the engine processor, user information based on the one or more parameters received from the user device;

receiving one or more electronic transaction orders at the exchange computer system;

determining whether a first value, indicated by the market data received over the computer network and from the user device, satisfies the first threshold provided in the user information;

determining, by the engine processor, whether the first threshold is satisfied;

in response to determining that the first threshold is not satisfied, executing, the one or more electronic transaction orders, and transmitting information, to the user device, about the executed one or more electronic transaction orders;

in response to determining that the first threshold is satisfied, canceling, in a first operation mode of the engine processor, the one or more electronic transaction orders, the first operation mode configured to generate and transmit cancellation instructions to the user device;

in response to cancelling the one or more electronic transaction orders, generating an electronic update indicating (i) cancelation of the one or more electronic transaction orders and (ii) indicating currently available offers and quotes for electronic transaction orders; and transmitting the electronic update to the user device or a second exchange computer system external to the exchange computer system.

11. The method of claim 10, the one or more parameters comprising one or more of:

a type of order;

a time period for implementing the user information;

a range of values or a particular value associated with a notional threshold that is different than the first threshold; and a value or range of values associated with a credit limit associated with the user information.

12. The method of claim 11, further comprising:

determining that a sub-threshold associated with the notional threshold is satisfied, the sub-threshold being different than the notional threshold and the first threshold, and wherein the sub-threshold corresponds to a first level and the notional threshold corresponds to a second level that is different than the first level.

13. The method of claim 12, wherein the first level is less than the second level.

14. The method of claim 10, comprising:

electronically grouping, into one set, the one or more electronic transaction orders with the user information based on a pre-defined criteria in the one or more parameters received from the user device.

15. The method of claim 10, wherein the exchange computer system is a distributed computer system configured to:

receive, through one or more order entry ports, the one or more electronic transaction orders associated with the user information; and route, using an order routing system, the one or more electronic transaction orders;

generate, using a manager, the user information; and match, using an order matching system, transactions between a plurality of market participants.

16. The method of claim 15, comprising:

simultaneously cancelling all of the one or more electronic transaction orders in one or more symbols.

17. The method of claim 10, wherein the user information includes one or more of a user identification, biometric data, password, or security-related information.

18. The method of claim 17, comprising:
validating, utilizing at least one of the one or more of a user identification, biometric data, password, or security-related information, creation of the user information by the exchange computer system.

19. The method of claim 10, further comprising:
receiving a second user information that includes a second threshold, the second user information being different than the user information, and the second threshold being different than the first threshold; and
determining that a second set of one or more electronic transaction orders are associated with the second user information, wherein the first threshold associated with the user information has one or more different values than the second threshold associated with the second user information.

20. The method of claim 19, further comprising:
determining that the first threshold is satisfied and that the second threshold is not satisfied.

\* \* \* \* \*